United States Patent [19]
Nishimura

[11] Patent Number: 6,111,372
[45] Date of Patent: Aug. 29, 2000

[54] SENSORLESS MOTOR DRIVER

[75] Inventor: Kazuhiko Nishimura, Kyoto, Japan

[73] Assignee: Rohm Co., Ltd., Kyoto, Japan

[21] Appl. No.: 09/249,860

[22] Filed: Feb. 16, 1999

[30] Foreign Application Priority Data

Feb. 16, 1998 [JP] Japan .................................. 10-032921

[51] Int. Cl.[7] .................................................. H02K 23/00
[52] U.S. Cl. ........................ 318/254; 318/138; 318/439;
318/599; 318/293; 318/811
[58] Field of Search .................................... 318/254, 138,
318/439, 599, 293, 811

[56] References Cited

U.S. PATENT DOCUMENTS 5,317,243  5/1994  Cameron ................................. 318/254
5,517,095  5/1996  Carobolante et al. .................. 318/254
5,869,944  2/1999  Tanina ..................................... 318/599

Primary Examiner—Karen Masih
Attorney, Agent, or Firm—Arent Fox Kintner Plotkin & Kahn

[57] ABSTRACT

A sensorless motor driver receives the back electromotive forces appearing in the individual coils provided one for each phase in a brushless motor and the voltage at the node common to all of those coils, and produces square-wave signals including noise. These signals are then subjected to masking by a masking circuit in accordance with a noise masking signal produced by a masking signal producing circuit. In accordance with the thus masked signals, a driving current is supplied to the brushless motor. The driving current varies according to the load on the motor. The masking signal producing circuit monitors the driving current supplied to the motor, and outputs the masking signal in such a way that the length of the masking periods varies according to the driving current.

6 Claims, 4 Drawing Sheets

SENSORLESS MOTOR DRIVER

BACKGROUND OF THE INVENTION

1. Field of the Invention

The present invention relates to a sensorless motor driver for driving a brushless motor as is used to drive the rotation of the cylinder of a VCR (videocassette recorder), the spindle of a floppy disk drive, or the like.

2. Description of the Prior Art

A sensorless motor driver compares, by the use of comparators, the back electromotive forces appearing in the individual coils provided one for each phase in a three-phase brushless motor with the voltage at the node common to all of those three coils, and thereby produces square-wave signals. These square-wave signals are then used by the subsequent circuits to produce driving signals for three phases. As the transistors provided to supply a current to the brushless motor are turned on or off, noise is generated by the back electromotive forces appearing in the individual coils provided one for each phase in the brushless motor. This noise is generated every time the transistor for each phase is turned on or off, and therefore the comparators, which receive back electromotive forces including such noise, outputs square-wave signals including noise. The timing with which the noise is generated is predicted by monitoring the driving signals, and therefore it is customary to eliminate noise from the square-wave signals by the use of a masking circuit in accordance with a noise masking signal. The noise masking signal is produced by a masking signal producing circuit.

In a conventional sensorless motor driver, the masking signal producing circuit outputs pulses having regular pulse widths so that noise is masked only in the periods corresponding to the widths of those pulses. This method, however, has the following disadvantage. When the motor has just been started, or when the load on the motor becomes heavier, the servo system lets more current flow into the brushless motor. This increases the back electromotive forces appearing in the motor, and thus increases the intensity, and also the duration, of the noise generated when the current-supplying transistors are turned on or off. When the duration of the noise exceeds the length of the noise masking periods in the noise masking signal, it is not possible to eliminate the noise completely. This leads to unstable rotation of the motor. To avoid this, it is possible to attempt complete elimination of the noise by making the noise masking periods longer. However, lengthening the noise masking periods means lengthening the periods in which the noise masking signal is kept at a low level, and this undesirably shortens the detection periods in which the detection of the rotation position of the rotor of the motor is possible.

Thus, when the rotation speed of the motor exceeds a certain level, there remains no such detection period at all, and accordingly the motor driver cannot detect the rotation position and thus cannot drive the motor. In this way, the longer the noise masking periods, the lower the upper limit of the rotation frequency of the motor, and this makes it impossible to drive the brushless motor at a satisfactorily high speed.

SUMMARY OF THE INVENTION

An object of the present invention is to provide a sensorless motor driver that can drive the rotation of a brushless motor stably by ensuring that noise is masked completely even when the duration of the noise generated every time a driving current is switched on or off becomes longer as a result of an increase in the current that flows through the brushless motor as occurs when the brushless motor has just been started or when the load on the brushless motor becomes heavier, without lowering the upper limit of the rotation frequency of the brushless motor.

To achieve the above object, according to the present invention, a sensorless motor driver is provided with: a comparator circuit for producing square-wave signals by comparing the back electromotive forces appearing in the coils provided one for each phase in a brushless motor with the voltage at the node common to all of those coils; a masking circuit for performing masking on the square-wave signals in accordance with a noise masking signal; a masking signal producing circuit for producing the noise masking signal; a driving signal producing circuit for producing a driving signal from the square-wave signals masked by the masking circuit; and a current supplying circuit for supplying a driving current to the brushless motor in accordance with the driving signal. Here, the driving current is monitored so that the length of the noise masking periods is varied according to the driving current.

According to this circuit configuration, even when the duration of the noise generated every time a power transistor is turned on or off becomes longer as a result of an increase in the driving current as occurs when the brushless motor has just been started or when the load on the brushless motor becomes heavier, it is possible to eliminate noise completely by making the noise masking periods longer. When the load on the motor is not heavy, by making the noise masking periods shorter, it is possible to detect the rotation position of the motor, and thus rotate the motor at a satisfactorily high speed. This makes it possible to obtain stable rotation without lowering the upper limit of the rotation frequency of the motor.

BRIEF DESCRIPTION OF THE DRAWINGS

This and other objects and features of the present invention will become clear from the following description, taken in conjunction with the preferred embodiments with reference to the accompanied drawings in which.

DESCRIPTION OF THE PREFERRED EMBODIMENTS

Figure 1:
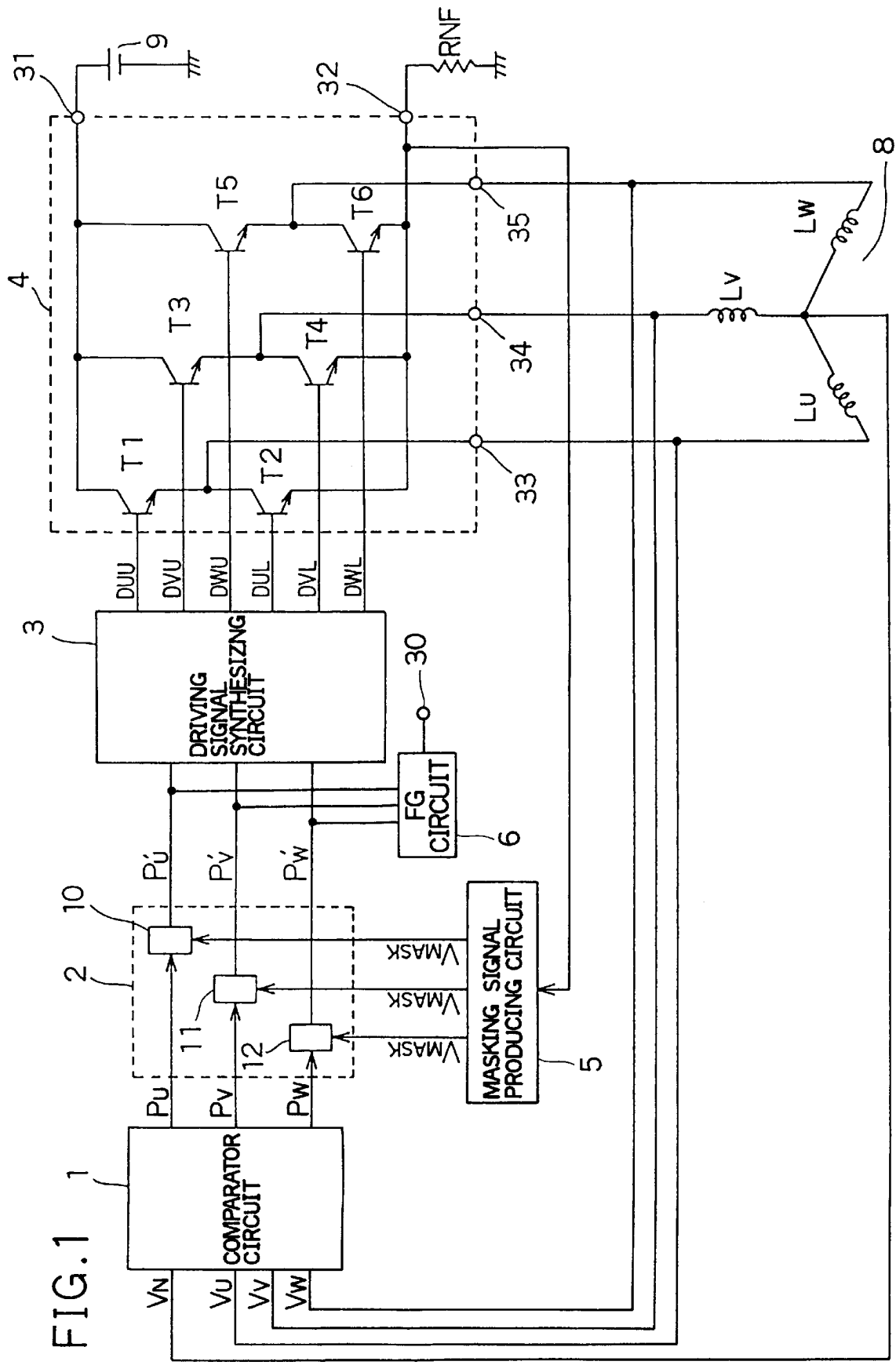
FIG. 1 is a block diagram of a sensorless motor driver embodying the invention.

Hereinafter, an embodiment of the present invention will be described. FIG. 1 is a block diagram of a sensorless motor driver embodying the invention. This sensorless motor driver compares, by the use of a comparator circuit 1, the back electromotive forces $V_U$, $V_V$, and $V_W$ appearing in the individual coils $L_U$, $L_V$, and $L_W$ provided one for each phase in a brushless motor 8 with the voltage $V_N$ at a node common to all of those coils, and thereby produces square-wave signals $P_U$, $P_V$, and Next, a masking circuit 2 performs masking on those square-wave signals $P_U$, $P_V$, and $P_W$ in accordance with a noise masking signal $V_{MASK}$ having, as will be described later, noise masking periods, and thereby transforms them into signals $P_U'$, $P_V'$, and $P_W'$. The masking circuit 2 has gate circuits 10 to 12 provided one for each of the square-wave signals $P_U$, $P_V$, and $P_W$ so as to perform masking on the square-wave signals $P_U$, $P_V$, and $P_W$ when the noise masking signal $V_{MASK}$ is at a low level and let those signals pass intact when the noise masking signal $V_{MASK}$ is at a high level. The noise masking signal $V_{MASK}$ is produced by a masking signal producing circuit 5.

In accordance with the signals $P_U'$, $P_V'$, and $P_W'$ which are produced by performing masking on, and thereby removing noise from, the square-wave signals $P_U$, $P_V$, and $P_W$, a drive signal synthesizing circuit 3 produces driving signals DUU, DVU, DWU, DUL, DVL, and DWL. A current supplying circuit 4 has power transistors T1 to T6 whose on/off state is controlled by the driving signals DUU, DVU, DWU, DUL, DVL, and DWL, respectively.

Moreover, in accordance with the signals $P_U'$, $P_V'$, and $P_W'$ an FG circuit 6 produces an FG signal that indicates the rotation speed of the brushless motor 8, and outputs this signal via a terminal 30 of the sensorless motor driver. The FG signal is used in a monitoring device provided to monitor the rotation or in a servo system (not shown) provided to stabilize the rotation speed.

The npn-type power transistor T1 has its collector connected to a terminal 31, and has its emitter connected to the collector of the npn-type power transistor 72. The power transistor T1 receives at its base the driving signal DUU. The power transistor T2 has its emitter connected to a terminal 32, and receives at its base the driving signal DUL. The node between the power transistors T1 and T2 is connected, via a terminal 33 of the current supplying circuit 4, to the U-phase coil $L_U$ of the brushless motor 8.

Similarly, the npn-type power transistor 73 has its collector connected to the terminal 31, and has its emitter connected to the collector of the npn-type power transistor T4. The power transistor 73 receives at its base the driving signal DVU. The power transistor T4 has its emitter connected to the terminal 32, and receives at its base the driving signal DVL. The node between the power transistors T3 and T4 is connected, via a terminal 34 of the current supplying circuit 4, to the V-phase coil $L_V$ of the brushless motor 8.

Similarly, the npn-type power transistor 75 has its collector connected to the terminal 31, and has its emitter connected to the collector of the npn-type power transistor T6. The power transistor T5 receives at its base the driving signal DWU. The power transistor T6 has its emitter connected to the terminal 32, and receives at its base the driving signal DWL. The node between the power transistors T5 and T6 is connected, via a terminal 35 of the current supplying circuit 4, to the W-phase coil $L_W$ of the brushless motor 8.

The terminal 31 is connected to a supply voltage 9. The terminal 32 is connected through a resistor RNF to ground. Through the resistor RNF flows a current that is the sum of the driving current flowing through the individual coils provided one for each phase in the brushless motor 8. According to the current that flows through the resistor RNF, the voltage across the resistor RNF (i.e. the voltage appearing at the terminal 32) varies. Thus, the resistor RNF permits detection of the driving current. The voltage across the resistor RNF is fed to the masking signal producing circuit 5.

Note that the resistor RNF is used also to enable the above-mentioned servo system (not shown) to monitor the current flowing through the brushless motor 8. That is, the servo system monitors both the driving current and the FG signal so that, for example, when the rotation speed of the brushless motor 8 drops, it increases the current flowing through the brushless motor 8 so as to keep its rotation speed constant. Although the resistor RNF is connected to the ground-level terminal 32 of the current supplying circuit 4 in this embodiment, it permits detection of the driving current also when it is connected between the supply voltage 9 and the supply-voltage terminal 31 of the current supplying circuit 4.

The masking signal producing circuit 5 outputs a masking signal having masking periods that are determined in accordance with the driving current of the motor (i.e. in accordance with the voltage across the resistor RNF).

When the brushless motor 8 has just been started, or when the load on the brushless motor 8 becomes heavier, the driving current increases. As the driving current increases, the duration of the noise that is generated every time the transistors T1 to T6 are turned on or off becomes longer. However, in such cases, the masking periods in the masking signal are made accordingly longer, and thus the noise is eliminated completely.

Figure 2:
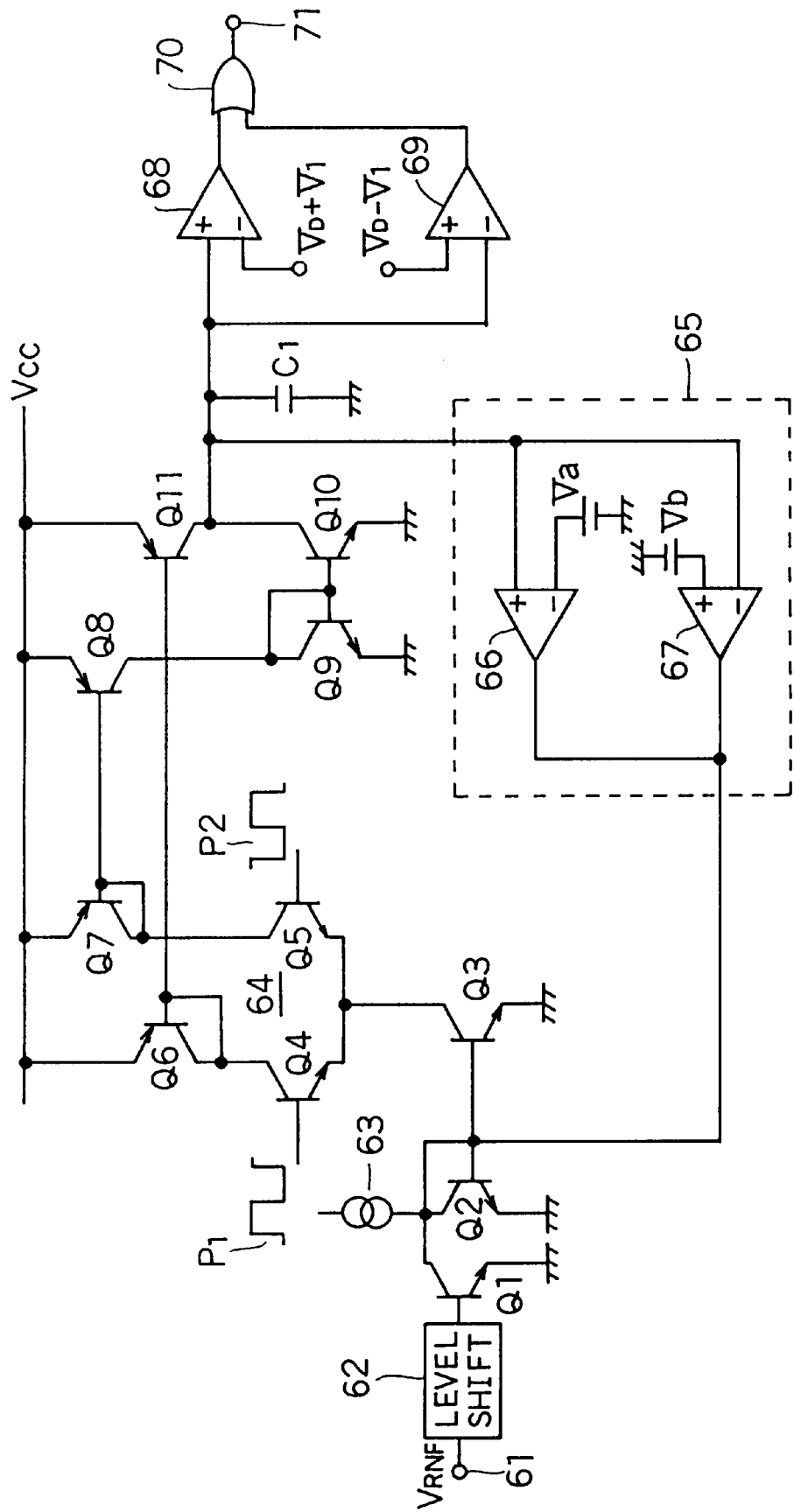
FIG. 2 is a circuit diagram of the noise masking signal producing circuit of the sensorless motor driver shown in FIG. 1.

FIG. 2 shows an example of the configuration of the masking signal producing circuit 5. In FIG. 2, the voltage $V_{RNF}$ appearing across the resistor RNF is fed to a terminal 61. The resistor RNF is usually given a low resistance, and therefore the voltage appearing across it is low. Accordingly, this voltage is fed through a level shift circuit 62 to the base of an npn-type transistor Q1. The transistor Q1 has its emitter connected to ground, and has its collector connected to the collector of an npn-type transistor Q2.

The transistor Q2 has its collector connected to its base and also to a constant current source 63, has its emitter connected to ground, and has its base connected to the base of an npn-type transistor Q3. The transistor Q3 has its emitter connected to ground. The transistors Q2 and Q3 constitute a first current mirror circuit.

The transistor Q3 has its collector connected to the emitters of npn-type transistors Q4 and Q5 that are connected differentially, and thus serves as a current source for a differential amplifier 64. The transistor Q4 has its collector connected to the collector and the base of a pnp-type transistor Q6, and the transistor Q5 has its collector connected to the collector and the base of a pnp-type transistor Q7. The transistor Q6, together with a pnp-type transistor Q11, constitutes a second current mirror circuit, and the transistor Q7, together with a pnp-type transistor Q8, constitutes a third current mirror circuit . The transistors Q6, Q7, Q8, and Q11 have their emitters connected to the supply voltage $V_{CC}$.

The transistor Q8 has its collector connected to the collector and the base of an npn-type transistor Q9. The transistor Q9, together with an npn-type transistor Q10, constitutes a fourth current mirror circuit. The transistor Q10 has its collector connected to the collector of the transistor Q11. The transistors Q9 and Q10 have their emitters connected to ground.

The node between the collectors of the transistors Q10 and Q11 is connected to one end of a capacitor $C_1$, which has its other end connected to ground. The capacitor $C_1$ is connected to the input of a clamp circuit 65, whose output is connected to the bases of the transistors Q2 and Q3. The clamp circuit 65 has two comparators 66 and 67. The comparator 66 receives, at its non-inverting terminal (+), the voltage at the capacitor $C_1$, and, at its inverting terminal (−), a voltage Va. The comparator 67 receives, at its non-inverting terminal (+), a voltage Vb, and, at its inverting terminal (−), the voltage at the capacitor $C_1$. The voltages Va and Vb are shown at (d) in FIG. 4.

The voltage at the capacitor $C_1$ is fed also to the non-inverting terminal (+) of a comparator 68 and to the inverting terminal (−) of a comparator 69. The comparator 68 receives, at its inverting terminal (−), a voltage $V_D + V_1$, and the comparator 69 receives, at its non-inverting terminal (+), a voltage $V_D - V_1$. The output of the comparators 68 and 69 is delivered, as the masking signal, through an OR circuit 70 to an output terminal 71. This masking signal is fed to a multiplexer (not shown) connected to the output terminal 71, and is therefrom distributed chronologically to the gate circuits 10, 11, and 12 shown in FIG. 1.

Figure 3:
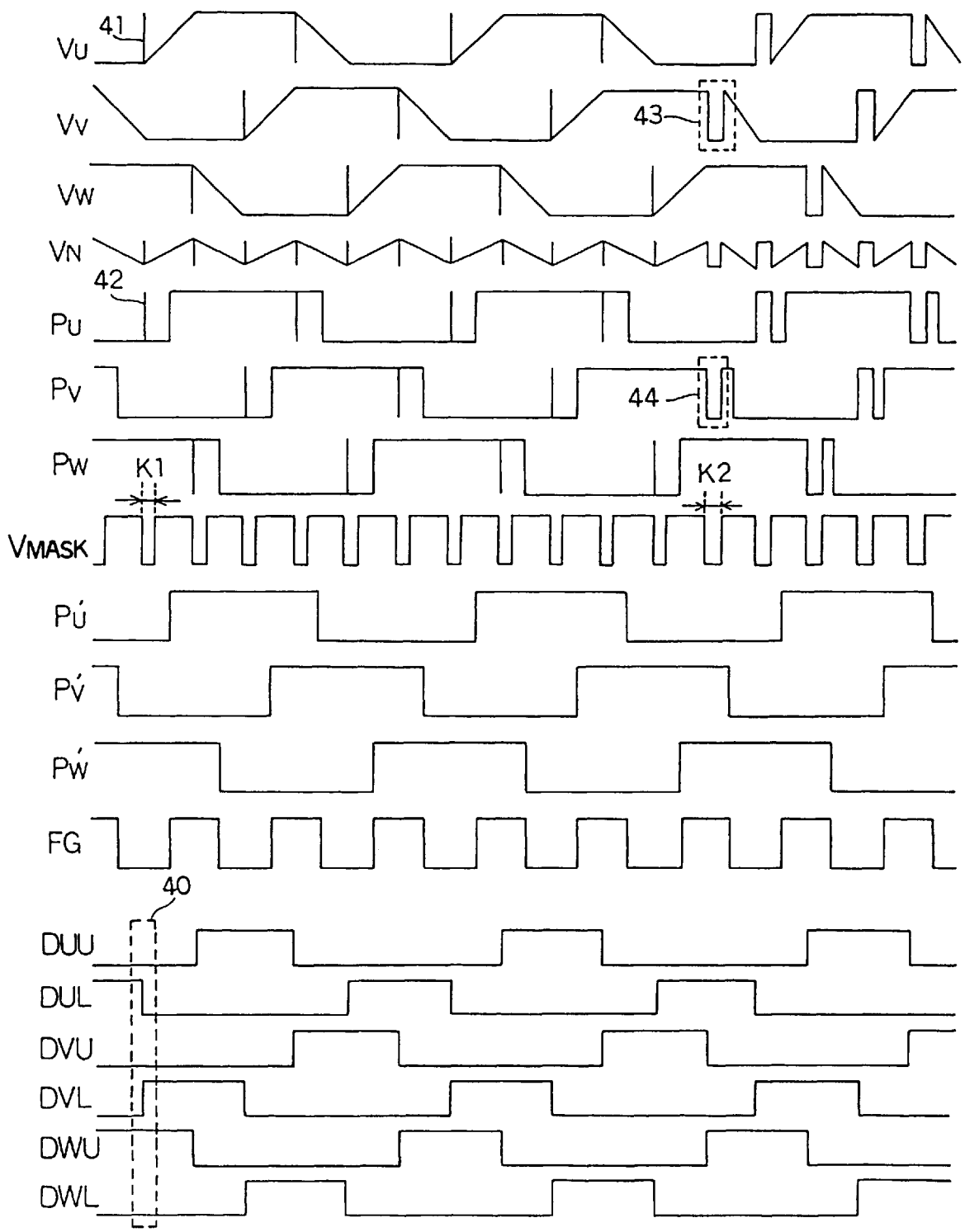
FIG. 3 is a diagram showing the waveforms observed at various points in the sensorless motor driver shown in FIG. 1 in illustration of its operation.
Figure 4:
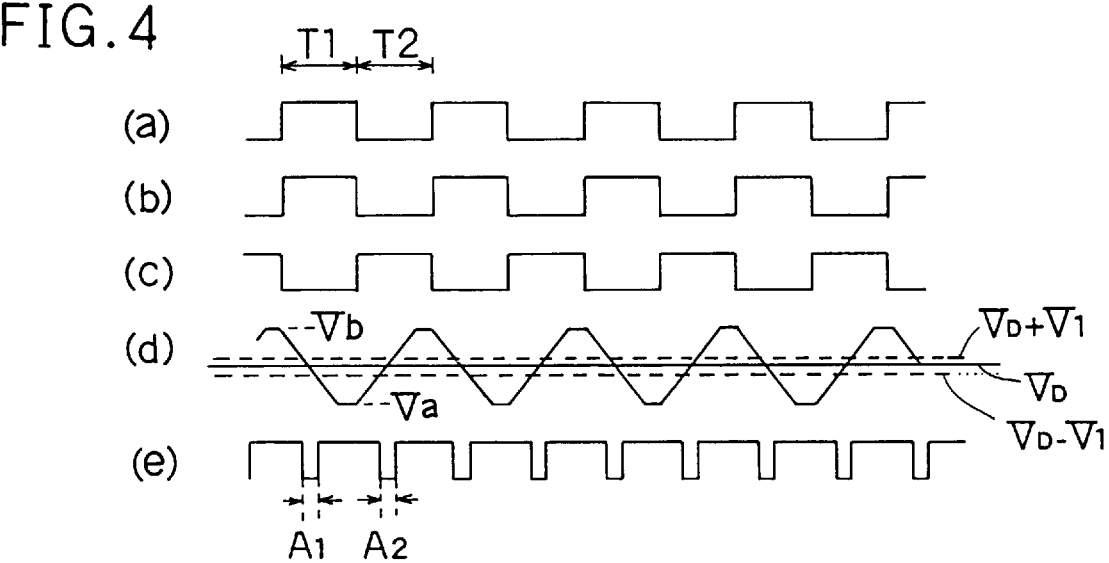
FIG. 4 is a diagram showing the waveforms observed at various points in the noise masking signal producing circuit shown in FIG. 2 in illustration of its operation.

Next, the operation of the circuit shown in FIG. 2 will be described. The transistors Q4 and Q5 of the differential amplifier 64 receive, at their bases, pulse signals $P_1$ and $P_2$ whose level changes in synchronism with the FG signal that the FG circuit 6 produces and outputs via the terminal 30 (FIG. 3). The pulse signals $P_1$ and $P_2$ have opposite polarities. In FIG. 4, at (a) is shown the FG signal, at (b) is shown the pulse signal $P_1$, and at (c) is shown the pulse signal $P_2$. The transistors Q4 and Q5 are turned on or off in accordance with whether the pulse signal applied to their respective base is at a high level or at a low level, respectively. Accordingly, the transistors Q4 and Q5 of the differential amplifier 64 are turned on and off alternately.

In FIG. 4, during a period T1, the transistors Q5, Q7, Q8, Q9, and Q10 are kept on, and the transistors Q4, Q6, and Q11 are kept off. As a result, a current proportional to the current flowing though the transistor Q5 flows through the transistor Q10. The collector current of the transistor Q10 discharges the capacitor $C_1$. During the subsequent period T2, the transistors Q4 to Q11 are kept in opposite states to the states in which they were during the period T1. As a result, a current proportional to the current flowing through the transistor Q4 flows through the transistors Q11. Thus, the capacitor $C_1$ is charged through the transistor Q10.

In this way, charging and discharging of the capacitor $C_1$ is repeated. Consequently, the voltage across the capacitor $C_1$ varies so as to have a triangular waveform as shown at (d) in FIG. 4. Note here that, as shown at (d) in FIG. 4, the ridge portions of the triangular waves are sliced off by the operation of the clamp circuit 65.

The voltage across the capacitor $C_1$ is fed to the comparators 68 and 69. The comparator 68 outputs a high level when the voltage at the capacitor $C_1$ is higher than $V_D + V_1$, and outputs a low level otherwise. On the other hand, the comparator 69 outputs a high level when the voltage at the capacitor C, is lower than $V_D - V_1$, and outputs a low level otherwise. Accordingly, by extracting the outputs of these comparators through the OR circuit 70, a signal as shown at (e) in FIG. 4 is obtained. The voltages $V_D$ and $V_1$ are shown at (d) in FIG. 4. Thus, when the voltage at the capacitor $C_1$ is within the range $\pm V_1$ relative to the center voltage $V_D$, the OR circuit 70 outputs a low level. The periods A1, A2, . . . in which the OR circuit 70 outputs a low level are used as the masking periods. The length of these masking periods depends on the inclination of the above-mentioned triangular waves; in other words, it varies according to the charging/discharging current of the capacitor $C_1$. In the circuit shown in FIG. 2, the charging/discharging current of the capacitor $C_1$ depends on the current that flows through the transistor Q3.

The output current of the constant current source 63 flows through the transistors Q1 and Q2 to ground. When the voltage $V_{RNF}$ fed to the terminal 61 is high (i.e. when the driving current of the motor is large), the transistor Q1 becomes more conductive, and thus more current flows from the constant current source 63 through the transistor Q1. Accordingly, the current flowing through the transistor Q2 decreases, and thus the current flowing through the transistor Q3 also decreases. As the current flowing through the transistor Q3 decreases, the charging/discharging current of the capacitor C, decreases. This makes the inclination of the triangular waves shown at (d) in FIG. 4 less steep, and thus makes the masking periods A1, A2, . . . longer. In short, as the driving current of the motor increases and thus the voltage $V_{RNF}$ rises, the masking periods become longer; by contrast, as the driving current of the motor decreases and thus the voltage $V_{RNF}$ drops, the masking periods become shorter.

As the load on the motor becomes heavier and the driving current of the motor increases, the duration of the noise that accompanies the switching of the three-phase driving current becomes longer. In this embodiment, however, the driving current is monitored so that, when the driving current increases, the masking periods in which the noise is masked are made accordingly longer and thereby the noise is eliminated completely.

Figure 5:
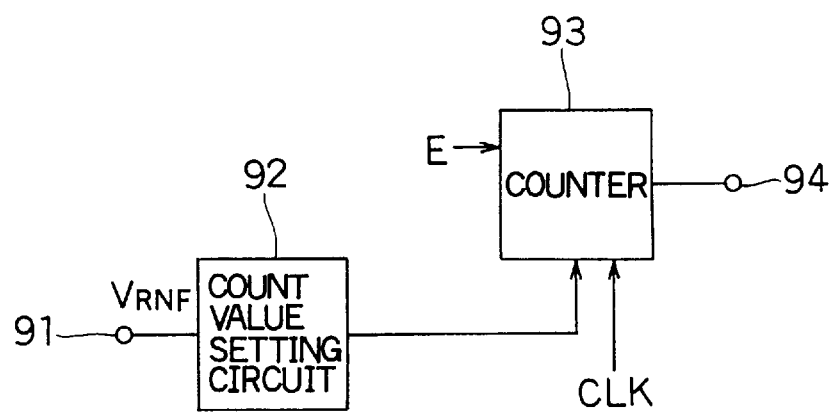
FIG. 5 is a circuit diagram of another example of the noise masking signal producing circuit.
Figure 6:
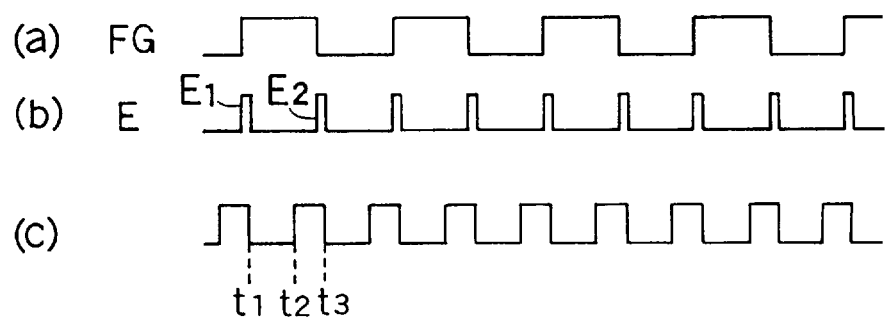
FIG. 6 is a diagram showing the waveforms observed at various points in the noise masking signal producing circuit shown in FIG. 5 in illustration of its operation.

FIG. 5 shows another example of the configuration of the masking signal producing circuit in which the masking periods are created by the use of digital circuits. In accordance with the voltage $V_{RNF}$ fed in via a terminal 91, a count value setting circuit 92 sets a value to be counted. A counter 93 starts counting (i.e. counting pulses in a clock signal CLK) in response to an edge signal E, shown in FIG. 6, that is fed thereto in synchronism with a rising edge of the $F_D$ signal. When the actual count reaches the value to be counted as set by the count value setting circuit 92, the counter 93 is reset. With reference to FIG. 6, this can be explained as follows. The counter 93 starts counting at a time point t1 when the first edge signal $E_1$ is fed thereto, and is reset at a time point t2 when the actual count reaches the above-mentioned value to be counted. The counter 93 outputs a low level while counting, and outputs a high level otherwise.

The counter 93 starts counting again (t3) when the next edge signal $E_2$ is fed thereto, and is reset when it has counted up to the value to be counted. The periods in which the counter 93 outputs a low level are used as the masking periods. The masking signal is delivered to an output terminal 94. In this embodiment, the length of the masking periods (i.e. the low-level periods) depends on the value to be counted, and this value to be counted is varied according to the voltage $V_{RNF}$ obtained by monitoring the driving current of the motor.

FIG. 3 is a wave diagram illustrating how the sensorless motor driver shown in FIG. 1 operates. In the sensorless motor driver shown in FIG. 1, the driving signal synthesizing circuit 3 produces the driving signals DUU, DUL, DVU, DVL, DWU, and DWL. In accordance with whether the driving signals DUU, DUL, DVU, DVL, DWU, and DWL are at a high level or at a low level, the current supplying circuit 4 turns on or off the power transistors T1 to T6, respectively. In this way, a three-phase driving current is supplied to the brushless motor 8, and thereby the brushless motor 8 is driven.

In the coils provided one for each phase in the brushless motor 8, the back electromotive forces $V_U$, $V_V$, and $V_W$ appear, which have a phase difference of 120° with respect to one another. Now consider, for example, the period enclosed in a broken-line box 40. In this period, while the driving signal DWU is kept at a high level, the driving signal DUL drops from a high level to a low level, and the driving signal DVL rises from a low level to a high level. As a result, while the power transistor T5 is kept on, the power transistor T2 is turned from on to off, and the power transistor T4 is turned from off to on.

This generates noise 41 in the back electromotive force $V_U$ appearing in the U-phase coil $L_U$. Similar noise is generated also for the V and W phases. In this way, noise is generated every time the power transistors T1 to T6 are turned on or off. Note that the voltage $V_N$ at the node common to all of those coils also oscillates; this is due to the asymmetry that arises differently in different phases among the circuits involved.

In the comparator circuit 1, the back electromotive forces $V_U$, $V_V$, and $V_W$ are individually compared with the voltage $V_N$ at the common node, and thereby the square-wave signals $P_U$, $P_V$, and $P_W$ are produced. Therefore, the noise 41 generated in the back electromotive force $V_U$ appears as noise 42 also in the square-wave signal $P_U$. Similar noise appears also in the square-wave signals $P_V$ and $P_W$.

To eliminate such noise, the masking signal producing circuit 5 produces the noise masking signal $V_{MASK}$, and feeds it to the masking circuit 2. The masking circuit 2 masks noise when the noise masking signal $V_{MASK}$ is at a low level, and lets the signals it receives pass intact when the noise masking signal $V_{MASK}$ is at a high level. As a result, the square-wave signals $P_U$, $P_V$, and $P_W$ are transformed into the masked square-wave signals $P_U'$, $P_V'$, and $P_W'$. The timing with which noise is generated is predicted from the timing with which the output of the driving signals DUU, DUL, DVU, DVL, DWU, and DWL is switched on and off, and therefore it is possible, as described above, to make the noise masking periods long enough to eliminate noise irrespective of the duration thereof by the use of the circuit shown in FIG. 2 or 5.

In accordance with the signals $P_U'$, $P_V'$, and $P_W'$, the FG circuit 6 produces the FG signal that indicates the rotation speed. When the load on the brushless motor 8 becomes heavier while it is being driven, and as a result the above-mentioned servo system increases the current that flows through the brushless motor 8, the duration of noise becomes accordingly longer as shown in a broken-line box 43. This also makes longer the duration of the noise appearing in the square-wave signal $P_V$ as shown in a broken-line box 44.

As a result, in the conventional sensorless driver described earlier, where the length K1 of the noise masking periods is fixed, it is impossible to eliminate noise completely, and therefore noise appears in the signals $P_U'$, $P_V'$, and $P_W'$. By contrast, according to the present invention, the noise masking periods produced by the masking signal producing circuit 5 are made longer as indicated by K2, and therefore no noise appears in the signals $P_U'$, $P_V'$, and $P_W'$. Accordingly, even when the load becomes heavier, the driving signals DUU, DUL, DVU, DVL, DWU, and DWL are not affected at all, and thus it is possible to obtain stable rotation of the brushless motor 8.

As described above, in a sensorless motor driver according to the present invention, when the current flowing through the brushless motor 8 increases as when the brushless motor 8 has just been started or when the load on the brushless motor 8 becomes heavier, the noise masking periods are made longer, and thus it is possible to eliminate noise completely. On the other hand, when the driving current is small, the noise masking periods are made shorter. This makes it possible to detect the rotation position of the rotor of the brushless motor 8 even when it is driven at a high speed, and thus helps obtain stable rotation without lowering the upper limit of the rotation frequency of the brushless motor 8.

For example, in cases where the brushless motor 8 is comparatively large, and thus has large-inductance coils and requires a large driving current as in cases where the brushless motor 8 is used to rotate the cylinder of a video-cassette recorder, the noise that accompanies the switching of the on/off state of the transistors T1 to T6 is accordingly intense and long. Even then, it is possible to eliminate the noise completely. Moreover, in such cases, the load on the brushless motor 8 tends to become heavier often because of, for example, unstable running of the video tape. Even then, it is possible to drive the brushless motor 8 stably.

What is claimed is:

1. A sensorless motor driver comprising:
    a comparator circuit for producing square-wave signals by comparing back electromotive forces appearing in coils provided one for each phase in a brushless motor with a voltage at a node common to all of those coils;
    a masking circuit for performing masking on said square-wave signals in accordance with a noise masking signal;
    a masking signal producing circuit for producing said noise masking signal;
    a driving signal producing circuit for producing a driving signal from said square-wave signals masked by said masking circuit;
    a current supplying circuit for supplying a driving current to said brushless motor in accordance with said driving signal; and
    current monitoring means for monitoring said driving current,
    wherein said masking signal producing circuit varies a length of masking periods within said noise masking signal according to a signal from said current monitoring means.

2. A sensorless motor driver as claimed in claim 1,
    wherein said current monitoring means is a resistor so connected that the driving current for all phases flows therethrough.

3. A sensorless motor driver as claimed in claim 1,
    wherein said masking signal producing circuit comprises:
    a capacitor;
    a charging/discharging circuit for supplying said capacitor with a charging/discharging current so that a voltage across said capacitor varies so as to have a triangular waveform;
    a first circuit for outputting a signal including masking periods that coincide with periods in which the voltage across said capacitor is within a predetermined range relative to a center of a range over which it varies; and
    a second circuit for feeding said charging/discharging circuit with a current that varies according to an output of said current monitoring means,
    wherein said charging/discharging circuit outputs the charging/discharging current in accordance with said current fed thereto by said second circuit.

4. A sensorless motor driver as claimed in claim 3, wherein said charging/discharging circuit has a differential amplifier, said differential amplifier using as its current source the current fed from the second circuit, said differential amplifier being composed of a pair of transistors that are alternately turned on by a pulse signal that changes its level in synchronism with switching of the driving current supplied to the brushless motor, with an output current of one of those transistors used as the charging current and an output current of the other used as the discharging current.

5. A sensorless motor driver as claimed in claim 3, wherein said masking signal producing circuit has a clamp circuit for slicing off ridge portions of the output voltage of the capacitor that varies so as to have a triangular waveform.

6. A sensorless motor driver as claimed in claim 1, wherein said masking signal producing circuit comprises:

a count value setting circuit for setting a value to be counted in accordance with a voltage fed from said current monitoring means; and a counter that starts counting in response to an edge signal that is fed thereto in synchronism with switching of the driving signal supplied to the brushless motor and that is reset when its count reaches the value to be counted as set by said count value setting circuit, wherein said masking signal producing circuit outputs as the masking signal an output of said counter obtained while said counter is counting.

* * * * *